US007617211B2

(12) United States Patent
Kres

(10) Patent No.: US 7,617,211 B2
(45) Date of Patent: Nov. 10, 2009

(54) SYSTEM AND METHOD FOR AUTOMATICALLY SYNCHRONIZING SECURITY-RELEVANT INFORMATION BETWEEN A RELATIONAL DATABASE AND A MULTIDIMENSIONAL DATABASE

(75) Inventor: André Kres, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 11/129,261

(22) Filed: May 12, 2005

(65) Prior Publication Data
US 2006/0026180 A1 Feb. 2, 2006

(30) Foreign Application Priority Data
Aug. 2, 2004 (EP) .................... 04103713

(51) Int. Cl.
*G06F 7/00* (2006.01)
*G06F 17/30* (2006.01)
(52) U.S. Cl. ................. 707/9; 707/1; 709/225
(58) Field of Classification Search ........... 707/1–10, 707/100–104.1, 200–206; 709/223–225; 715/741–743
See application file for complete search history.

(56) References Cited

U.S. PATENT DOCUMENTS

| 5,862,325 | A | * | 1/1999 | Reed et al. | 709/201 |
| 5,892,900 | A | * | 4/1999 | Ginter et al. | 726/26 |
| 5,910,987 | A | * | 6/1999 | Ginter et al. | 705/52 |
| 5,966,715 | A | * | 10/1999 | Sweeney et al. | 707/203 |
| 5,991,751 | A | * | 11/1999 | Rivette et al. | 707/1 |
| 6,085,191 | A | * | 7/2000 | Fisher et al. | 707/9 |
| 6,453,339 | B1 | * | 9/2002 | Schultz et al. | 709/206 |
| 7,082,422 | B1 | * | 7/2006 | Zirngibl et al. | 706/45 |
| 2002/0029296 | A1 | * | 3/2002 | Anuff et al. | 709/311 |
| 2002/0184187 | A1 | * | 12/2002 | Bakalash et al. | 707/1 |
| 2007/0094265 | A1 | * | 4/2007 | Korkus | 707/9 |

OTHER PUBLICATIONS

Kirkgoze et al., A security concept for OLAP, Sep. 1-2, 1997, IEEE, 619-626.*
Fugkeaw et al., A-COLD: Access Control of Web OLAP over Multi-data Warehouse, Mar. 16-19, 2009, IEEE, 469-474.*

* cited by examiner

*Primary Examiner*—Jean B. Fleurantin
(74) *Attorney, Agent, or Firm*—Kunzler & McKenzie

(57) ABSTRACT

A security management system and method for managing access security in an IT-environment comprises a relational database of the ROLAP type and a data warehouse of the MOLAP type. The system shares a subset of common data, wherein database access security for accessing particular database tables is managed by user-related access limitations in a table form. The present system transforms the access-limiting conditions existing at the ROLAP system automatically to a respective filter criterion for the MOLAP system. The access-limiting conditions exiting at the ROLAP system are defined in a table form. The present system and method automatically activates filter criterion whenever an access to the MOLAP system is requested by a user.

20 Claims, 5 Drawing Sheets

View with Security including access limiting Dimension

Security Table 56

| User ID | Country | Branch Office | Datagroup |
|---------|---------|---------------|-----------|
| User1 | Germany | BERLIN | Parts |
| User2 | Germany | * | Finance |
| User1 | Germany | BERLIN | Finance |
| User3 | Germany | * | Headcount |

FIG. 4

USER VERIFICATION SEQUENCE 305

- 310: For each Cube:
- 312: Get qualified Users
- Select distinct UserID from Security, Olap Cube Description Table Where <Security clearance is as described for the Olap Cube>
- 314: Maintain Userlist for a Cube
- Add / Remove User ID from/to cube to be equal with list of qualified users

Tables
- Security Table I
- Olap Cube Description Table II
- Olap Cube Profile Description Table III

FILTER GENERATION SEQUENCE 306

- 322: Get Input for Filter Creation
- Select distinct <filtercriteria> from Security, Olap Cube Desc, Olap Cube Profile Desc Where <Security clearance is as described for the Olap Cube> and < profile matches to profile description>
- 324: Create Filters
- Create a filter via API for each unique security setting (combination of security feature/limit out of security table + read/write/calculate statement from Profile table)
- 326: Create User Group for each filter
- Use filter criteria as name

USER-TO-GROUP ASSIGNMENT SEQUENCE 307

- 330: Assign User to group
- A user can be member in one or in many groups depending on the list out of the select.
- (Select distinct userid <filtercriteria> from Security, Olap Cube Desc, Olap Cube Profile Desc Where <Security clearance is as described for the Olap Cube> and < profile matches to profile description>)

OPERATIONAL SEQUENCES 308

SYSTEM AND METHOD FOR AUTOMATICALLY SYNCHRONIZING SECURITY-RELEVANT INFORMATION BETWEEN A RELATIONAL DATABASE AND A MULTIDIMENSIONAL DATABASE

PRIORITY CLAIM

The present application claims the priority of European patent application, Serial No. 04103713.6, titled "Security Transfer Tool Between DB2 and DB2 OLAP," which was filed on Aug. 2, 2004, and which is incorporated herein by reference.

FIELD OF THE INVENTION

The present invention relates to the field of security management in "business intelligence" systems, and in particular to managing access security in an information technology (IT) environment having both a ROLAP and a MOLAP type systems.

BACKGROUND OF THE INVENTION

A multidimensional database (MDB) is a type of database that is optimized for data warehouse and online analytical processing (OLAP) applications. Multidimensional databases are frequently created using input from existing relational databases. Whereas a relational database is typically accessed using a Structured Query Language (SQL) query, a multidimensional database allows a user to ask questions, such as "How many Aptivas have been sold in Nebraska so far this year?" and similar questions related to summarizing business operations and trends. An OLAP application that accesses data from a multidimensional database is known as a MOLAP (multidimensional OLAP) application.

A multidimensional database management system (MD-DBMS), that is also referred to herein as a multidimensional database, implies the ability to rapidly process the data in the database so that answers can be generated quickly. A number of vendors provide products that use multidimensional databases. Data storage and user interface methods vary from vendor to vendor.

Conceptually, a multidimensional database uses an idea of a "data cube" (further referred to herein as a "cube") to represent dimensions of data available to a user. For example, "sales" could be viewed in the dimensions of product model, geography, time, or some additional dimension. In this example, "sales" implies a measure attribute of the data cube. Other dimensions are seen as feature attributes, which allow setup of focus criteria of the measure attribute. Additionally, a database creator can define hierarchies and levels within a dimension, for example, state and city levels within a regional hierarchy.

As used herein, a data cube comprises an n-dimensional matrix of measure attribute values stored as multidimensional database in a multidimensional database management system.

A conventional MDDBMS is illustrated in FIG. 1. With reference to FIG. 1, an end user PC 10 (networked user computer 10) is connected to a relational ROLAP type database system, i.e., a relational database (ROLAP) 12 and to a multidimensional database system, implementing a data warehouse (MOLAP) 14. Both relational database 12 and data warehouse 14 store data about the same business, but the systems work differently, as will be described below.

Data processing may take place within the database system, a mid-tier server, or the client. In a two-tiered architecture, the user submits a Structure Query Language (SQL) query to the database and receives back the requested data. In a three-tiered architecture, the user submits a request for multidimensional analysis and the ROLAP engine converts the request to SQL for submission to the database.

The operation is performed in reverse: the engine converts the resulting data from SQL to a multidimensional format before it is returned to the client for viewing. As is typical of relational databases, some queries are created and stored in advance. If the desired information is available, then that query will be used, which saves time. Otherwise, the query is created on the fly from the user request.

Since ROLAP uses a relational database, it requires more processing time and/or disk space to perform some of the tasks for which multidimensional databases are designed. However, ROLAP supports larger user groups and greater amounts of data and is often used when these capacities are crucial, such as in a large and complex department of an enterprise.

In the technical field of business intelligence, relational databases such as relational database 12 are often used for selective management of information. Businesses typically operate along multiple lines (customers, products, sales representatives, time etc.). Out of this context, applied mathematics shape a multidimensional array of figures describing the business to be measured in terms of a respective business model.

A conventional relational database 12 provides only two dimensions within a single table or a plurality of tables, which is insufficient for the mathematics associated to the business model. The conventional solution to this problem is to introduce a structure of tables called a "star model". The star model comprises a centre table that in turn comprises the business. Around the center table, additional related tables are arranged to provide a reference for the dimensions of the array (i.e., customer table, product map etc.).

FIG. 2 (FIGS. 2A, 2B) schematically illustrates a conventional security implementation in a ROLAP environment. System 20 comprises a security table 22, a limiting dimension denoted as organization (ORG) table 23, and a fact table 24. As shown in FIG. 2B, the conventional security table 22 comprises the access limitation of a user in the form of a linkage to a reference table or dimension. In this example, the reference table is a geographical attribute. For illustration, the access is delimited to data of a given Data group 56, where the member within the Geography dimension is "Germany". Further, this view to the fact table 24 is limited via the ORG table 23 that acts as a data map or translator. The facts data may belong to a dimension (Dim1) 25 comprising, for example, "products", a dimension (Dim2) 26 comprising, for example, "time", and a dimension (Dim3) 27 comprising, for example, "clients".

Although this technology has proven to be useful, it would be desirable to present additional improvements. The data volumes to be analyzed in such a business model are quite huge. Consequently, the on-the-fly calculation from rollup (totals) for larger organization units has not yet been possible due to a lack of available computing power. The common workaround usually stores the result of a rollup in aggregation tables, but the total amount of these aggregation tables grows to the same extent as the demand on new rollups (so-called frozen calculations).

This limitation of the conventional MDDBMS system was a motivation for the development of another conventional database technology, referred to as online analytic processing (OLAP) systems. The OLAP systems pre-calculate a multi-dimensional array in a night batch and store the results in a proprietary way, wherein all predefined aggregations on different levels and even formulas across different aggregation levels are performed. This processing is impossible with a relational system-based OLAP (ROLAP) type system.

Although OLAP and ROLAP technology have proven to be useful, it would be desirable to present additional improvements. A multidimensional system-based OLAP, herein referred to as MOLAP, has its limitations because it cannot store single records or textual information as, for example, descriptive texts, etc.

A multidimensional database 14 (FIG. 1) according to the MOLAP type stores n-dimensional matrices, i.e., one value for each combination of members of each dimension. With a suitably defined data cube, it is not possible to differentiate whether a data cube represents the total value of one record or that of many records. Designing the cube in a way that each cell represents a single record would enlarge the structure to an impractical size, i.e., dimensions with millions of members, wherein an unsatisfying large proportion of cells would not contain a value.

Although both the ROLAP system 12 and the MOLAP system 14 handle business intelligence data, the security handling is different. The internal security concept of relational databases, which is based on SQL-Data Definition Language (DDL), is only able to limit access to tables, but not to parts thereof, for example to particular ranges of rows within the table. In a ROLAP system, access rights are implemented by definition of user groups. ROLAP works satisfactorily only with access to all tables in one business model. In MOLAP type systems, the security management is analogous and treated completely independent from the ROLAP side management. Additionally, often a plurality of MOLAP databases exist in a given business environment, resulting in a respective multiple administration effort.

In the conventional MDDBMS of FIG. 1, there exists no method for providing a consistent handling of security in ROLAP and system 12 and MOLAP system 14. From a security management point of view, however, it is strongly desired to ensure that one and the same user of various business intelligence systems (of the ROLAP and the MOLAP type) does not obtain different levels of information out of different systems. This includes the meanings of the respective content.

In other approaches, the missing integration of security between ROLAP and MOLAP leads to significantly difficult administration. In large companies with specialized user communities that all have access to the underlying relational database (ROLAP), the direct link between authorization and database in a multidimensional database management system leads to an unmanageable situation, apart from the manpower involved.

Conventional "automated security operator systems" that are also referred to herein as ASO systems, exist for mainframe-based systems, i.e., host systems and relational databases. These ASO systems are able to support processes to add and remove users on host-based database systems or add and remove rows in tables, a process, which may manage access limits for the access to the data stored in the database. ASO systems require the involvement of non-technical staff (usually managers) for automatically managing huge amounts of systems including a respective dedicated data access. However, ASO systems cannot manage the administration of multidimensional databases. Further, ASO systems are not designed to keep a consistent security approach in various systems.

Therefore, conventional systems provide for security in a way that involves management interaction and manual work 13 on the MOLAP side, and inconsistencies between ROLAP and MOLAP security. Often, conventional MOLAP security management must simplify the handling of security to a decision of "free access or no access" to keep the MOLAP system manageable. What is therefore needed is a system, a computer program product, and an associated method for a security transfer tool between a ROLAP type database and a MOLAP type database sharing a subset of common data. The need for such a solution has heretofore remained unsatisfied.

SUMMARY OF THE INVENTION

The present invention satisfies this need, and presents a system, a computer program product, and an associated method (collectively referred to herein as "the system" or "the present system") for automated synchronisation of security-relevant information about users between a relational database-based online analytic processing (ROLAP) system and a multidimensional database-based data processing system (MOLAP) (referred to herein as a data warehouse).

The security relevant information is required, for example, in relation to conventional operations such as create, grant, revoke, or delete. The limiting conditions that exist at the ROLAP system are defined in a table form and are transformed automatically to a respective filter criterion. The created filters are assigned to predetermined user groups. After a user is successfully identified as a valid MOLAP and ROLAP user, the user is assigned to one of the user groups. The user then receives access according to the specific user group. The user group has access rights to the MOLAP system that coincide consistently with the access rights to the requested data in ROLAP.

The present system uses views comprising the requested data, wherein the views combine one or multiple dimension tables with a table (further referred to herein as a security table) containing the access limitations for these dimensions.

For example, if a user is allowed to see only German data in a worldwide data warehouse, then the value "Germany" will be stored for the user in this security table and will be joined directly or via a geography dimension table. Consequently, the present system offers direct authorization to a user for access to only specific cells in the multidimensional array. These authorized cells fulfill a certain member combination, for example, any combination where the geography member is "Germany". In this example, the authorized access is for read or for write Thus, according to one aspect of the present invention, a method for managing access security in an IT-environment is disclosed, that comprises a ROLAP type database system and a MOLAP type database system sharing a subset of common data. Furthermore, user access to the common data is defined by way of pre-defined data groups defining predetermined access security properties with respective access qualifications in a respective security table.

Access qualifications may be, for example a relation to a particular Country managed with a "Country" attribute and indicating a respective membership of the user thereto. Access qualifications may also be specified with a "Branch office" attribute for defining an access attribute such as "reading allowed", or "writing allowed", or "calculating allowed", or negations and combinations thereof, selective within a particular country, or other data representing respective business sections.

In a preferred embodiment, the system of the present invention manages user group related access limitations of the ROLAP type database system for cubes stored within the MOLAP type data base system, wherein the access limitations comprise a join of one or more of the data groups with a user group attribute, preferable in a security table as a part of the ROLAP type database system. The system further assigns a user to a particular one of the user groups, and grants access to a user requesting access to the MOLAP type system according to the access qualification associated with the usergroup, to which the access-requesting user is assigned.

The term "join" is intended to include, for example, any conjunction between the joined items, which conjunction is satisfied when the semantic meaning thereof is that both items are "true" for a given requesting user.

In this basic form of the present system, all cubes have the same access conditions and the MOLAP access is strictly organized according to the rules as defined within the ROLAP type system. Consequently, on a simple level, access consistency is achieved between ROLAP and MOLAP systems.

Data groups defining access security properties may be managed other than in form of a relational table. Data groups defining access security properties may be stored for example in a text file in form of a table-like array having a respective number of columns and rows, or in single data objects implementing such data groups in a respective separate way, etc.

Further, the access limitations comprise a join of one or more of the data groups with a user group attribute. For a particular cube managed within the MOLAP type database system, respective user group attributes specify respective access limitations for the cube and the user group, and a respective maximum allows user access definition. The present system creates a filter for accessing a particular cube within the data warehouse by performing the extended join operation, then, additionally, defines for each cube a particular access type that provides for some selective distinction between the user groups defined above.

The present invention may be implemented by a method that joins tables in the relational database system. In this case, the present method comprises the steps of operating a table within the relational database and creating a filter for accessing a particular cube within the data warehouse by joining the tables. The table comprises a cube managed within the data warehouse. Further, respective user group attributes specify respective access limitations for the cube and the user group and a respective maximum allows user access definition.

The present method further comprises operating a table within the relational database. The table comprises, for example, an OLAP cube description table within the relational database. The relational database comprises cubes managed within the data warehouse. The method further operates respective business sections, for example "finance", "parts", "headcount", etc. for specifying a relationship between a user and his "home business section". Furthermore, the present method performs pre-filtering, which saves computational resources.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 4 is a schematic representation illustrating a control flow of the security transfer tool of FIG. 3 when automatically defining the access limitations to the MOLAP data warehouse.

DETAILED DESCRIPTION OF PREFERRED EMBODIMENTS

Figure 1:
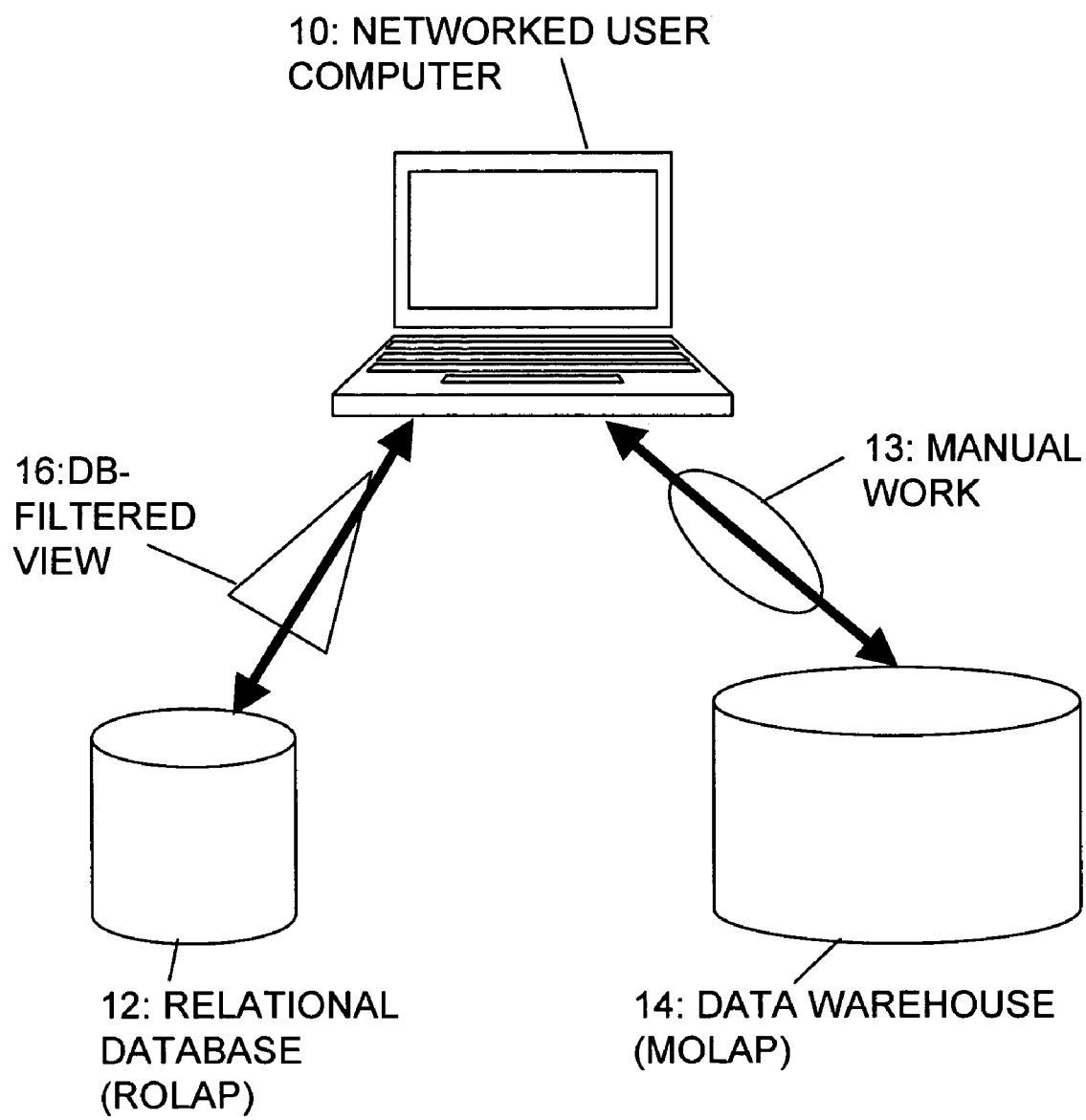
FIG. 1 is a schematic conventional overview representation illustrating a conventional IT system comprising a ROLAP relational database and a MOLAP data warehouse.
Figures 2A, 2B:
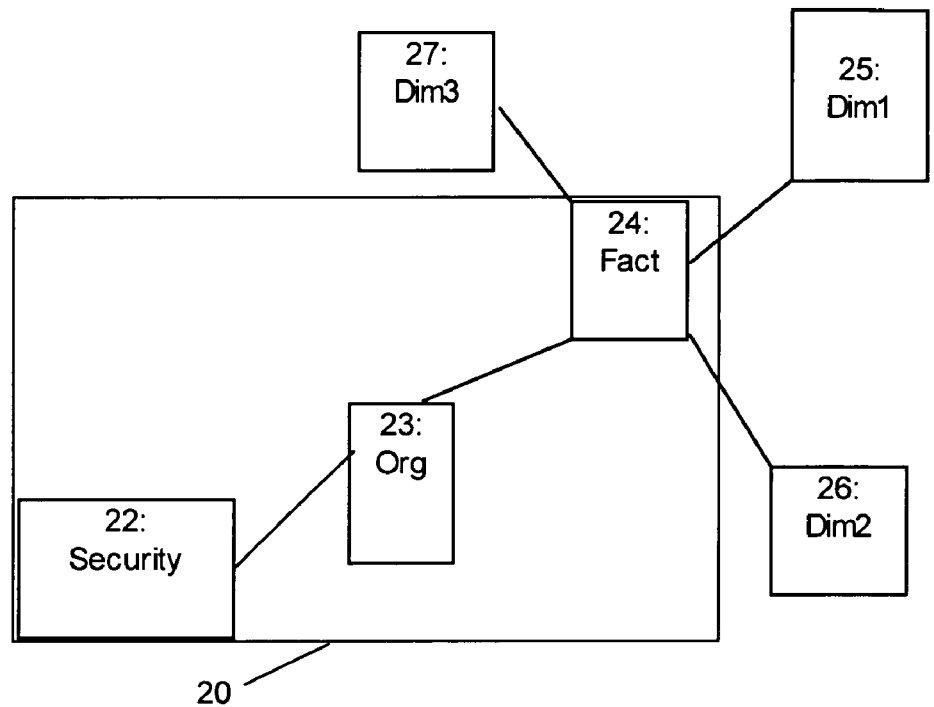
FIG. 2 comprises FIGS. 2A and 2B and represents a schematic representation illustrating a conventional view of requested data residing in the MOLAP data warehouse illustrated in FIG. 1.

The following definitions and explanations provide background information pertaining to the technical field of the present invention, and are intended to facilitate the understanding of the present invention without limiting its scope:

Computer or Software Program: An application that includes any expression, in any language, code or notation, of a set of instructions intended to cause a system having an information processing capability to perform a particular function, such as: conversion to another language, code or notation; or reproduction in a different material form.

Fact Table: A type of table in a dimensional model. A fact table typically comprises two types of columns: fact columns and foreign keys to the dimensions.

Hierarchy: A hierarchy defines a navigating path for drilling up and drilling down. All attributes in a hierarchy belong to the same dimension.

Metadata: Data about data. For example, the number of tables in a database is a type of metadata.

Metric: A measured value. For example, total sales is a metric.

OLAP: On-Line Analytical Processing. OLAP is computer processing that enables a user to easily and selectively extract and view data from different points of view. To facilitate data analysis, OLAP data is stored in a multidimensional database. A multidimensional database considers each data attribute (such as product, geographic sales region, and time period) as a separate "dimension." OLAP software locates the intersection of dimensions (i.e., all products sold in the Eastern region above a certain price during a certain time period) and displays them. Attributes such as time periods can be broken down into subattributes. OLAP can be used for data mining or the discovery of previously undiscerned relationships between data items.

MOLAP: Multidimensional OLAP. MOLAP systems store data in multidimensional cubes. MOLAP is online analytical processing (OLAP) that indexes directly into a multidimensional database. In general, an OLAP application treats data multidimensionally; the user is able to view different aspects or facets of data aggregates such as sales by time, geography, and product model. The data can be viewed multidimensionally stored in a relational database, but only by successively accessing and processing a table for each dimension or aspect of a data aggregate. MOLAP processes data that is already stored in a multidimensional array in which all possible combinations of data are reflected, each in a cell that can be accessed directly. For this reason, MOLAP is typically faster and more user-responsive than relational online analytical processing (ROLAP), the main alternative to MOLAP. A hybrid OLAP (HOLAP) combines some features from both ROLAP and MOLAP. MOLAP is often used as part of a data warehouse application.

ROLAP: Relational OLAP. ROLAP systems store data in a relational database. Relational online analytical processing (ROLAP) is a form of online analytical processing (OLAP) that performs dynamic multidimensional analysis of data stored in a relational database rather than in a multidimensional database (which is usually considered the OLAP standard).

Snowflake Schema: A common form of dimensional model. In a snowflake schema, different hierarchies in a dimension can be extended into their own dimensional tables. Therefore, a dimension can have more than a single dimension table.

Star Schema: A common form of dimensional model, or schema, in which each dimension is represented by a single dimension table.

Figure 3:
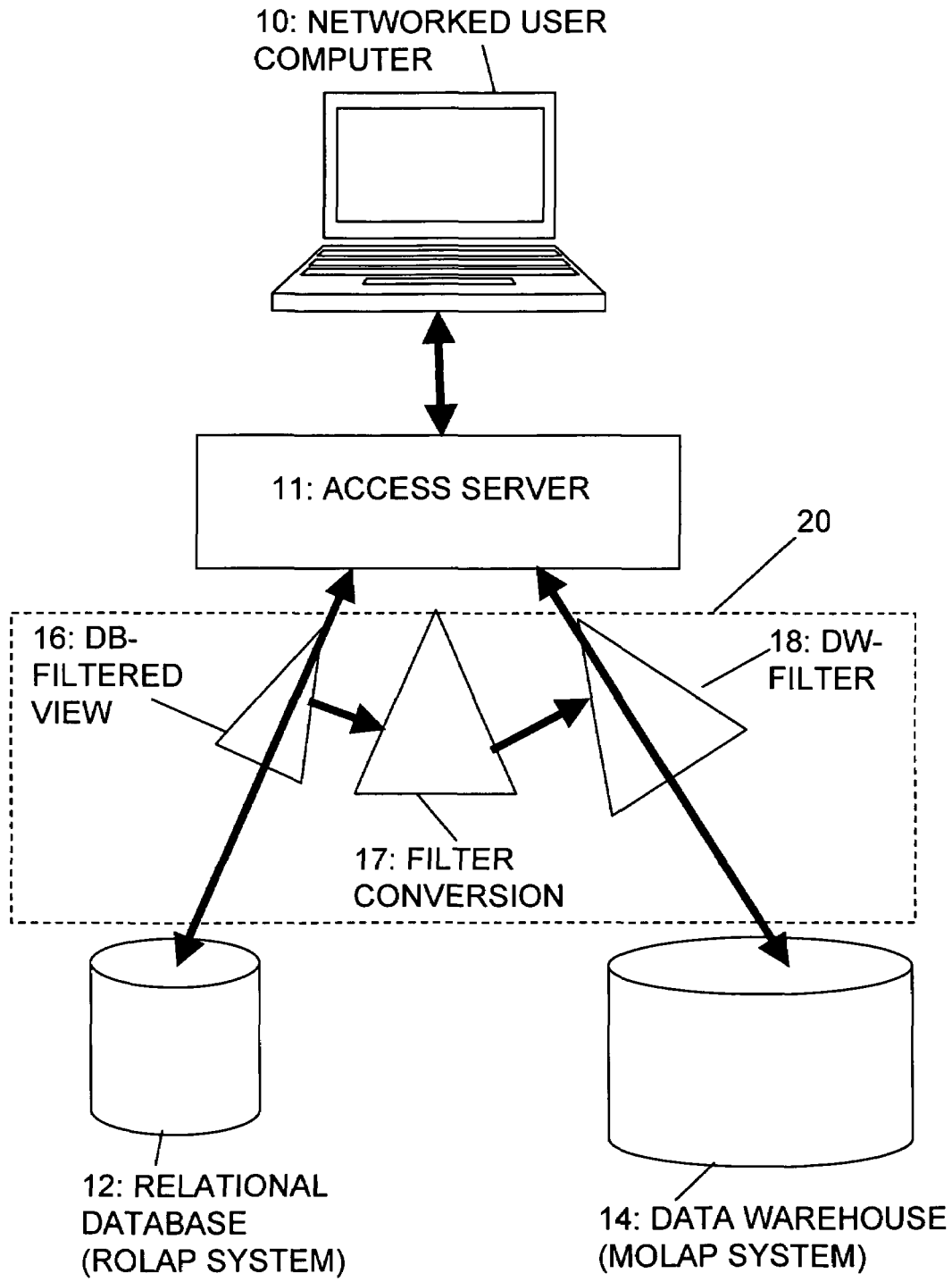
FIG. 3 is a schematic overview representation illustrating an exemplary operating environment in which a security transfer tool of the present invention can be used.

Data Mart: A minimized version of a data warehouse with a more limited audience and/or data content than a data warehouse. FIG. 3 portrays an exemplary overall environment in which a system, a computer program product, and an associated method (referred to collectively as "the system 20") for implementing a security transfer tool between a ROLAP type database and a MOLAP type database sharing a subset of common data according to the present invention may be used. A desktop PC 10 is shown connected in an enterprise network, wherein a relational database 12 (further referred to herein as a ROLAP system 12) implementing an exemplary ROLAP system and a data warehouse 14 (further referred to herein as a MOLAP system 14) implementing an exemplary MOLAP system are available for user access. According to a general feature of system 20, the security limitations defined for limiting the access of a particular user or user group as a filtered view to the contents of the ROLAP system 12 are determined and depicted symbolically as a DB-filtered view (also referred to herein as an access filter 16). Access filter 16 is then converted in a block of steps represented by filter conversion 17 to a data warehouse (DW) filter 18, which acts on the data warehouse 14. System 20 operates automatically without human intervention.

A program implementing an access synchronization method of system 20 resides at an access server 11. Access server 11 is dedicated to managing access by a user to the data warehouse 14. Access server 11 reads a configuration file containing all necessary information for controlling the access to the relational database 12 and to the data warehouse 14 such as, for example, path definitions, user passwords, server names, etc.

FIG. 4 illustrates operation of system 20. Operational sequences of system 20 comprise a "user verification" sequence 305, a "filter generation" sequence 306, and a "user-to-group assignment" sequence 307, collectively referred to as operational sequences 308. Each of the operational sequences 308 comprise a number of substeps.

The "user verification" sequence 305 and "filter generation" sequence 306 may operate in parallel. The "user-to-group" assignment sequence 307 is allowed to start only if the "user verification" sequence 305 and "filter generation" sequence 306 have successfully completed.

Figure 5:
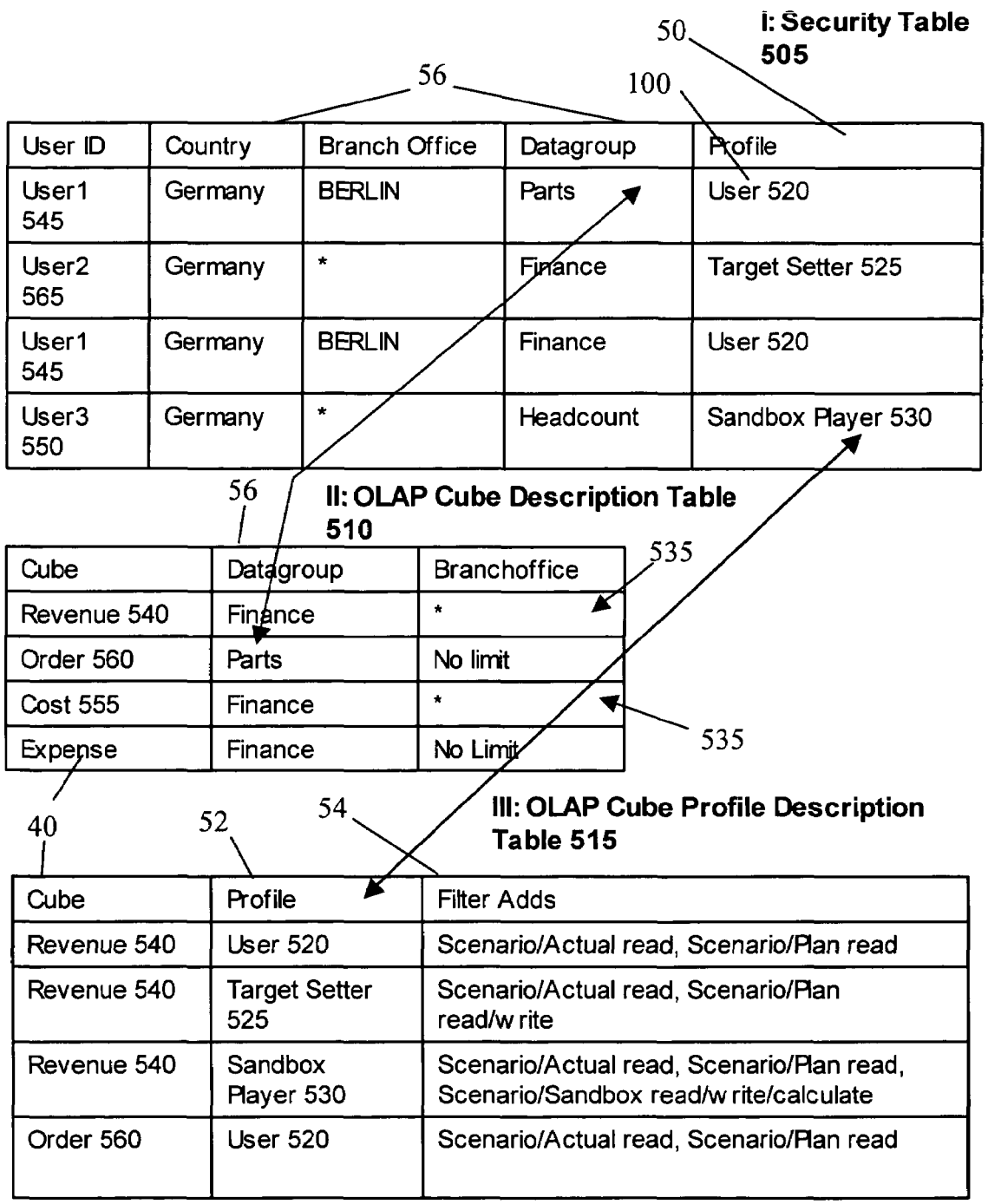
FIG. 5 is a diagram of exemplary tables that can be used by the security transfer tool of FIG. 3.

FIG. 5 illustrates tables utilized by system 20 to synchronize security settings between ROLAP system 12 and MOLAP system 14. Exemplary tables shown in FIG. 5 are a security table 505, an OLAP cube description table 510, and an OLAP cube profile description table 515. Contents shown for the security table 505, the OLAP cube description table 510, and the OLAP cube profile description table 515 are for exemplary purposes, only.

Security table 505 adds a "profile" column 50 to a conventional ROLAP system implementation, ROLAP system 12. The "profile" column 50 stores user group related access limitations. In the example of FIG. 5, group attributes for three distinct and different access limitations or modalities are shown: "user" 520, "target setter" 525, and "sandbox player" 530. The security table 505 further comprises conventional columns specifying User IDs and an association to a set of security properties 56 associated with a particular business section.

The security table 505 establishes a set of qualifying attributes for a user and for a given data group, for example, as follows:
the home country relation,
the branch office where a user works,
the data group in question (e.g. parts, finance, headcount, etc.), and
the access profile (i.e., security profile).

For example, the user 520 may have read access only. The target setter 525 may have read access and write access for a predetermined number of fields. The target setter 525 is enabled to set business "targets". The "sandbox player" 530 may have basically unlimited access rights including rights for calculation with values stored in the relational database 12 that enable the "sandbox player" 530 to, for example, perform forecast scenarios.

System 20 establishes the OLAP cube description table 510. The OLAP cube description table 510 addresses the cubes existing in the MOLAP system 14 and enables them to be used for a relation with the security table 505 of the user in order to "export" automatically the ROLAP security to the MOLAP system 14.

For each cube, a declaration has been made regarding which minimum security clearance a user needs for having a read access to the cube. Thus, in this example, the OLAP cube description table 510 enumerates all cubes with their individual minimum-security requirements by assigning the data group field 56 and the Branch office field thereto. A "*" symbol 535 indicates general access (e.g., Country Germany). The "*" symbol 535 in the branch office column indicates a general access to all branch offices in a given country. The "*" symbol 535 is analogous to the use of a wildcard and is used for exemplary purposes; any symbol may be used to accomplish the purpose of the "*" symbol 535.

System 20 establishes the OLAP cube profile description table 515. For each MOLAP cube, the access profile is defined by defining for each profile 52 the access limitations 54 to the cube 40. For example, the security profile "user" 520 is provided only with read access to the actual business scenario (i.e., the actual business data) and to the planned scenario.

A target setter 525, however, differs in that the target setter 525 is enabled to "write" in the planned scenario. A sandbox player 530 is equipped with read, write and calculate access rights for the sandbox scenario to allow him perform some "what-if" simulations with the business data.

Thus, the security table 505, the OLAP cube description table 510, and the OLAP cube profile description table 515 may be joined such that the relevant MOLAP security setting is automatically produced.

With further reference to FIG. 4, the head of a loop is entered at step 310, looping once for each cube (or database). Cubes or multidimensional databases are usually used in a data mart area of a business intelligence environment. Cubes usually have an individual handling of access security due to their individual contents. The management for each database is the same. However, each database is handled separately by system 20 because each database has individual security settings. Since security models within the cubes are independent, the process for each cube may run in parallel.

Substep 312 comprises obtaining qualified users. This may be achieved with a select statement (in pseudo code) such as: "Select distinct UserID from Security (Table), <Olap Cube Description Table> Where <Security clearance is as described for the Olap Cube>.

Qualified users have user IDs that comply at least with the minimum-security requirements of the database. For instance as defined by security table 505, user1 545 is not qualified for the Cube "revenue" 540 because, for the cube "revenue" 540, the branch office setting "*" symbol 535 is the minimum access requirement. The branch office "BERLIN" as indicated for user1 545 is not sufficient.

User3 550, for example, has an appropriate geographical access due to the "*" symbol 535 in the Branch office column for user3 550. However, user3 550 is not entitled to see finance data, as the Data group column for user3 550 specifies only "Headcount", i.e., number of employees.

Step 314 comprises maintaining a user list for a cube. New users can be created, while old users may be revoked at any point in time in the ROLAP system 12 as well as in the MOLAP system 14. A frequently repeated synchronisation in this respect is therefore necessary between those systems. System 20 achieves this synchronization as follows: The users who exist in the security table having an appropriate clearance remain untouched. Those users who are no longer qualified for a given cube because, for example, they no longer exist, they have limited security qualification settings, or their security qualification settings have been deleted or will be deleted. A new user is provided with a temporary password that is handled and distributed according to predetermined company policies.

The "filter generation" sequence 306 creates filters for any security feature defined or definable in the ROLAP security table 505. To get input for the filter creation (step 322), system 20 joins the security table 505 with the OLAP cube description table 510 to obtain the security limits of the "qualified users". System 10 adds the filter definition "filter add" from the profile description 515 to the security limits of the "qualified users".

For example, a select statement in pseudo code such as "Select distinct <filtercriteria> from Security, Olap Cube Description, Olap Cube Profile Description
Where <Security clearance is as described for the Olap Cube> and <profile matches to profile description>"
provides input for subsequent filter generation.

For example, assume that a "Germany" membership in the data group 56 "Country" is required. To enable user1 545 the actions allowed by the "user" profile 520 in the OLAP cube profile description table 515, the cubes "Revenue" 540 and "Cost" 555 in the example given in the OLAP cube description table 510 require a filter for "Germany" and "user" (i.e., in pseudo code: Geo/Germany Scenario/Actual read).

For the same allowances as described above for user1 545, the cube "order" 560 in the OLAP cube profile description table 515 requires addition of a filter for Germany/BERLIN for "user" 520 because a profile description for user1 545 is missing for "order" 560 in security table 505.

In a step 324, system 20 generates the filter via an application programming interface (API) for each unique security setting, i.e., for each unique combination of security feature and access limitation. The filter is generated out of the security table 505 and the read/write/calculate statement from the OLAP cube profile description 510.

Conventional APIs can be used by system 20. For example, to create a filter, system 10 can use the C-function "esscreatefilter( )".

Similarly, system 20 creates additional filter groups. System 20 generates a name for the filter group as an the input of the filter, such as:
Revenue_germany_targetsetter
Order_Germany_bonn_user;

A self-explaining filter group name increases the ease of administration. System 20 automatically creates the filter-group name without human intervention.

For each of the filters generated above in step 324, system 10 generates in step 326 a respective user group. A group name can be derived from the filter criteria used.

The "user-to-group assignment" sequence 307 assigns the users to user groups in step 330. The user groups are those user groups defined in step 326 with a (pseudo code) select statement:
(Select distinct UserID <filtercriteria> from Security, Olap Cube Desc, Olap Cube Profile Desc
Where <Security clearance is as described for the Olap Cube> and <profile matches to profile description>)

A user may have access to various cubes; the user may also have various profiles on one and the same cube (e.g., user 520 for Germany, target setter 525 for BERLIN).

Thus, system 20 generates a list of all users with all their security settings by joining the security table 505, the OLAP cube description table 510, and the OLAP cube profile description table 515 as cited above. The join is accomplished with two columns, the user id and the generic name out of the security features as mentioned previously.

For example, user1 545 is assigned to the user group "order_germany_berlin_user" and user2 565 is assigned to "revenue_germany_target_setter".

If a user tries to access a cube, the generated filter guarantees limitations of the data access in the underlying data warehouse 14 identical to the limitations of the data access defined in the relational database system 12. In this manner, security in the MOLAP system 14 is handled automatically and consistently with ROLAP system 12 security rules, providing both the MOLAP system 14 and the ROLAP system 12 are accessible and security of the ROLAP system 12 is up-to-date.

An example for implementing one embodiment of system 20 is given, wherein a BMT (Business Management Tool) database is of a ROLAP system 12 and an exemplary OAMS (Online Analysis and Measurement Tool based on Hyperion Essbase, later referred as DB2 OLAP data mart) represents the MOLAP system 14. In this example, system 10 uses the following information:
Begin example:
Tables and views:
The following tables and views are used for loading the Essbase Data mart security system, and are detailed below:
WBMTESPR—a Data mart application/entity profiles table;
WBMTESFL—access flags for Reporting, Headcount and Management data;
ESS_US_ACC—a basic Essbase Data mart user access view;
ESS_USER_ACCESS—an Essbase Data mart user access view with placeholder fields;

ESS_USER_ACC_FLAGS—a Essbase Data mart user access view taking in account access privileges to Reporting, Headcount, and Management data.

System 20 uses (reads) a configuration file. This configuration file keeps a name of the host BMT database, a host username, a host password, an Essbase server name, an Essbase user name, and an Essbase password. These values are used by system 20 to connect to the host BMT database and to the Essbase server. The configuration file resides only on the Essbase server computer. The configuration file also keeps a separate symbol that is used in filter name to separate parts of the filter name (as an example, symbol '#' below).

The configuration file contains Placeholders that are definitions such as:

Placeholder=DB-Column

For example:

!!BUC!!=buc (stands for: Business code unit)

The following is an exemplary procedure performed by system 20:

A. System 20 selects data from the configuration file and from the command line parameters and attempts to connect to the BMT host database and to the Essbase Data mart. If a connection is unsuccessful, system 20 cancels with an abend message.

B. System 20 removes all users from all groups in the Data mart, but keeps the users registered in the server (individual password). System 20 then removes all user groups for all applications and entities. (API functions EssListGroups( ), EssDeleteGroup( )).

C. System 20 selects a full list of users. (API functions EssListUsers( )).

D. A string with value of the current timestamp is formed.

E. System 20 builds and performs the select statement from the host:

```
SELECT
    ACC.BUC_FULL,
    ACC.PROFILE ,
    PRO.APPNAME ,
    PRO.ENTITY ,
    PRO.RIGHT ,
    PRO.FILTER ,
    ACC.!!placeholder_1!!,
    ACC.!!placeholder_2!!,
    ...
    ACC.!!placeholder_N!!
FROM    owner.ESS_USER_ACCESS ACC,
        owner.WBMTESPR PRO
WHERE          ACC.PROFILE = PRO.PROFILE
ORDER BY
    PRO.APPNAME ,
    PRO.ENTITY ,
    ACC.BUC_FULL,
    ACC.PROFILE
;
``` where phrases such as !!placeholder_N!! are replaced by values of placeholders read from the configuration file.

F. System 20 processes each of the received rows.
1. For each unique combination of values of the fields APPNAME and ENTITY, system 20 performs the following functions:
   a) delete all filters (API functions EssListFilters( ) and EssDeleteFilter( )).
   b) create a new filter and a new group for each unique combination of the fields BUC_FULL and PROFILE with a name such as; APPNAME#ENTITY#BUC_FULL#PROFILE;
   c) filter rows are built with data from a field RIGHT and a field FILTER. Values of the field RIGHT are used for the filter field 'Access'. The field 'Access' in the filter row is set on 'READ' if the selected field RIGHT is 'R' and 'WRITE' if one is 'W'. Values of the field FILTER are used for the filter 'Member Specification'. All parts such as !!placeholder!! are replaced by values from respective fields of a current row received from the host. A filter will contain as many rows as are delivered for this filter from the host.
   d) System 20 assigns the new filter to the new group with API function EssSetFilterList( ).

G. System 20 selects the all Essbase Data mart users with execution the next statement.

```
SELECT
    TSOUSER ,
    BUC_FULL ,
    APPNAME ,
    ENTITY ,
    PROFILE
FROM owner.ESS_USER_ACC_FLAGS;
```

H. System 20 processes each received row by the following method.
1. Seek the user member in the list created in the point C that user name=TSOUSER. If the user is not in the list, a new user is created;
2. The user is added to the group that is named as APPNAME#ENTITY#BUC_FULL#PROFILE (API function EssAddToGroup( ));
3. The value of the current timestamp (see point D) is placed in the user description field ESS_DESC_T;

I. The list of the users is checked and each user is removed if its field ESS_DESC_T does not contain a current timestamp value.

Tables and Views Definitions.

The Datamart application/entity profiles table:

```
CREATE TABLE WBMTESPR
(
  APPNAME       VARCHAR(8)   NOT NULL,
  ENTITY        VARCHAR(8)   NOT NULL,
  PROFILE       CHAR (1)     NOT NULL,
  RIGHT         char (1)     NOT NULL,
  FILTER        VARCHAR(254) NOT NULL
) IN WBMDESPR.WBMSESPR;
--------------------------------------------------
COMMENT ON TABLE WBMTESPR IS
'Security profiles for the Essbase Datamart';
COMMIT;
--------------------------------------------------
COMMENT ON WBMTESPR
(
  APPNAME     IS
  'Name of an application in the Datamart',
  ENTITY      IS
  'Name of a database in the Datamart',
  FILTER      IS
  'Template for filter row',
  PROFile     IS
  'Type of the profile',
  RIGHT       is
  'Type of access privilege: R/W/N'
);
```

The Table for Keeping of Access Flags for Reporting, Headcount and Management Data:

```
CREATE TABLE WBMTESFL
    (
    APPNAME        VARCHAR(8) NOT NULL,
    ENTITY         VARCHAR(8) NOT NULL,
    REPORTFLAG     CHAR(1)  NOT NULL,
    HEADFLAG       CHAR(1)  NOT NULL,
    MGNTFLAG       CHAR(1)  NOT NULL
    ) IN WBMDESFL.WBMSESFL;
-------------------------------------------------
    COMMENT ON TABLE WBMTESFL IS
    'Security flags for the Essbase Datamart';
    COMMIT;
-------------------------------------------------
    COMMENT ON WBMTESFL
    (
    APPNAME         IS
    'Name of an application in the Datamart',
    ENTITY          IS
    'Name of a database in the Datamart',
    REPORTFLAG      is
    'Whether access is required to the Reporting data',
    HEADFLAG        IS
    'Whether access is required to the Headcount data',
    MGNTFLAG        is
    'Whether access is required to the Management data'
    );
```

The Basic Essbase Data Mart User Access View:

```
CREATE VIEW ESS_US_ACC
        (TSOUSER,
            BUC_FULL,
            BUC,
            PROFILE,
            REPORTFLAG,
            HEADFLAG,
            MGNTFLAG
        )
AS
SELECT DISTINCT
    TSOUSER,
    CASE
        WHEN VIEWCLASS = '01' THEN '0000000000'
        WHEN VIEWCLASS = '02' THEN
            CASE
                WHEN BMTBUC1 = ' ' THEN '0'
                ELSE BMTBUC1
            END
            || '000000000'
        WHEN VIEWCLASS = '03' THEN
            CASE
                WHEN BMTBUC1 = ' ' THEN '0'
                ELSE BMTBUC1
            END
            || REGION || '00000000'
        WHEN VIEWCLASS = '04' THEN
            CASE
                WHEN BMTBUC1 = ' ' THEN '0'
                ELSE BMTBUC1
            END
            || REGION || COUNTRY || '0000000'
        WHEN VIEWCLASS = '05' THEN
            CASE
                WHEN BMTBUC1 = ' ' THEN '0'
                ELSE BMTBUC1
            END
            || REGION || COUNTRY ||
            CASE
                WHEN BMTBUC4 = ' ' THEN '0'
                ELSE BMTBUC4
            END
            || '000000'
        WHEN VIEWCLASS = '06' THEN
            CASE
                WHEN BMTBUC1 = ' ' THEN '0'
                ELSE BMTBUC1
            END
            || REGION || COUNTRY ||
            CASE
                WHEN BMTBUC4 = ' ' THEN '0'
                ELSE BMTBUC4
            END
            || BUSINESSSEGMENT ||
            '00000'
        WHEN VIEWCLASS = '07' THEN
            CASE
                WHEN BMTBUC1 = ' ' THEN '0'
                ELSE BMTBUC1
            END
            || REGION || COUNTRY ||
            CASE
                WHEN BMTBUC4 = ' ' THEN '0'
                ELSE BMTBUC4
            END
            || BUSINESSSEGMENT || BRANCHOFFICE ||
            '0000'
        WHEN VIEWCLASS = '08' THEN
            CASE
                WHEN BMTBUC1 = ' ' THEN '0'
                ELSE BMTBUC1
            END
            || REGION || COUNTRY ||
            CASE
                WHEN BMTBUC4 = ' ' THEN '0'
                ELSE BMTBUC4
                ELSE BMTBUC4
            END
            || BUSINESSSEGMENT || BRANCHOFFICE
            || SUBBRANCHOFFICE ||
            '000'
        WHEN VIEWCLASS = '09' THEN
            CASE
                WHEN BMTBUC1 = ' ' THEN '0'
                ELSE BMTBUC1
            END
            || REGION || COUNTRY ||
            CASE
                WHEN BMTBUC4 = ' ' THEN '0'
                ELSE BMTBUC4
            END
            || BUSINESSSEGMENT || BRANCHOFFICE
            || SUBBRANCHOFFICE || TERRITORY||
            '00'
        WHEN VIEWCLASS = '10' THEN
            CASE
                WHEN BMTBUC1 = ' ' THEN '0'
                ELSE BMTBUC1
            END
            || REGION || COUNTRY ||
            CASE
                WHEN BMTBUC4 = ' ' THEN '0'
                ELSE BMTBUC4
            END
            || BUSINESSSEGMENT || BRANCHOFFICE
            || SUBBRANCHOFFICE || TERRITORY||
            CASE
                WHEN BMTBUC9 = ' ' THEN '0'
                ELSE BMTBUC9
            END
            || '0'
    ELSE
        CASE
            WHEN BMTBUC1 = ' ' THEN '0'
            ELSE BMTBUC1
        END
        || REGION || COUNTRY ||
        CASE
            WHEN BMTBUC4 = ' ' THEN '0'
            ELSE BMTBUC4
        END
        || BUSINESSSEGMENT || BRANCHOFFICE
        || SUBBRANCHOFFICE || TERRITORY||
        CASE
```

-continued

```
                WHEN BMTBUC9 = ' ' THEN '0'
                ELSE BMTBUC9
            END ||
            CASE
                WHEN BMTBUC10 = ' ' THEN '0'
                ELSE BMTBUC10
            END
    END
    CASE
        WHEN VIEWCLASS = '01' THEN 'BUC'
        WHEN VIEWCLASS = '02' THEN
            CASE
                WHEN BMTBUC1 = ' ' THEN '0'
                ELSE BMTBUC1
            END
        WHEN VIEWCLASS = '03' THEN
            CASE
                WHEN BMTBUC1 = ' ' THEN '0'
                ELSE BMTBUC1
            END
            || '-' || REGION
        WHEN VIEWCLASS = '04' THEN
            CASE
                WHEN BMTBUC1 = ' ' THEN '0'
                ELSE BMTBUC1
            END
            || '-' || REGION || '-' || COUNTRY
        WHEN VIEWCLASS = '05' THEN
            CASE
                WHEN BMTBUC1 = ' ' THEN '0'
                ELSE BMTBUC1
            END
            || '-' || REGION || '-' || COUNTRY || '-' ||
            CASE
                WHEN BMTBUC4 = ' ' THEN '0'
                ELSE BMTBUC4
            END
        WHEN VIEWCLASS = '06' THEN
            CASE
                WHEN BMTBUC1 = ' ' THEN '0'
                ELSE BMTBUC1
            END
            || '-' || REGION || '-' || COUNTRY || '-' ||
            CASE
                WHEN BMTBUC4 = ' ' THEN '0'
                ELSE BMTBUC4
            END
            || '-' || BUSINESSEGMENT
        WHEN VIEWCLASS = '07' THEN
            CASE
                WHEN BMTBUC1 = ' ' THEN '0'
                ELSE BMTBUC1
            END
            || '-' || REGION || '-' || COUNTRY || '-' ||
            CASE
                WHEN BMTBUC4 = ' ' THEN '0'
                ELSE BMTBUC4
            END
            || '-' || BUSINESSEGMENT || '-' || BRANCHOFFICE
        WHEN VIEWCLASS = '08' THEN
            CASE
                WHEN BMTBUC1 = ' ' THEN '0'
                ELSE BMTBUC1
            END
            || '-' || REGION || '-' || COUNTRY || '-' ||
            CASE
                WHEN BMTBUC4 = ' ' THEN '0'
                ELSE BMTBUC4
            END
            || '-' || BUSINESSEGMENT || '-' || BRANCHOFFICE
            || '-' || SUBBRANCHOFFICE
        WHEN VIEWCLASS = '09' THEN
            CASE
                WHEN BMTBUC1 = ' ' THEN '0'
                ELSE BMTBUC1
            END
            || '-' || REGION || '-' || COUNTRY || '-' ||
            CASE
                WHEN BMTBUC4 = ' ' THEN '0'
                ELSE BMTBUC4
            END
            || '-' || BUSINESSEGMENT || '-' || BRANCHOFFICE
            || '-' || SUBBRANCHOFFICE || '-' || TERRITORY
        WHEN VIEWCLASS = '10' THEN
            CASE
                WHEN BMTBUC1 = ' ' THEN '0'
                ELSE BMTBUC1
            END
            || '-' || REGION || '-' || COUNTRY || '-' ||
            CASE
                WHEN BMTBUC4 = ' ' THEN '0'
                ELSE BMTBUC4
            END
            || '-' || BUSINESSEGMENT || '-' || BRANCHOFFICE
            || '-' || SUBBRANCHOFFICE || '-' || TERRITORY
            || '-' ||
            CASE
                WHEN BMTBUC9 = ' ' THEN '0'
                ELSE BMTBUC9
            END
        ELSE
            CASE
                WHEN BMTBUC1 = ' ' THEN '0'
                ELSE BMTBUC1
            END
            || '-' || REGION || '-' || COUNTRY || '-' ||
            CASE
                WHEN BMTBUC4 = ' ' THEN '0'
                ELSE BMTBUC4
            END
            || '-' || BUSINESSEGMENT || '-' || BRANCHOFFICE
            || '-' || SUBBRANCHOFFICE || '-' || TERRITORY
            || '-' ||
            CASE
                WHEN BMTBUC9 = ' ' THEN '0'
                ELSE BMTBUC9
            END
            || '-' ||
            CASE
                WHEN BMTBUC10 = ' ' THEN '0'
                ELSE BMTBUC10
            END
    END,
    BMTDG1,
    REPORTINGCALL,
    HEADCOUNT,
    MGNTFLAG
FROM VGIWADM.WUACBMV
WHERE BMTDG1 IN ('Y', 'T');
```

The Essbase Data Mart User Access View with Placeholder Fields:

```
CREATE VIEW ESS_USER_ACCESS
(
    TSOUSER      ,
    BUC_FULL     ,
    PROFILE      ,
    REPORTFLAG   ,
    HEADFLAG     ,
    MGNTFLAG     ,
    BUC          ,
    COUTRYOUCODE
)
AS
SELECT
    ACC.TSOUSER    ,
    ACC.BUC_FULL   ,
    ACC.PROFILE    ,
    ACC.REPORTFLAG ,
    ACC.HEADFLAG   ,
    ACC.MGNTFLAG   ,
    ACC.BUC        ,
```

```
        COALESCE(ORG.CNTRY || '-' || ORG.OU_CD_LERU,
            'PDS_ORG')
    FROM
        WSDIWC.ESS_US_ACC ACC LEFT OUTER JOIN
        WSDIWC.BMVC_ORG_DESC ORG
    ON ACC.BUC_FULL = ORG.BUC
        ;
```

The Essbase Data mart User Access View Takes in Account Access Privileges to Reporting, Headcount, and Management Data:

```
    CREATE VIEW ESS_USER_ACC_FLAGS
    (
        TSOUSER   ,
        BUC_FULL  ,
        APPNAME   ,
        ENTITY    ,
        PROFILE
    )
    AS
    SELECT DISTINCT
        ACC.TSOUSER ,
        ACC.BUC_FULL ,
        PRO.APPNAME ,
        PRO.ENTITY ,
        PRO.PROFILE
    FROM WSDIWC.ESS_USER_ACCESS ACC,
        WSDIWC.WBMTESPR PRO ,
        WSDIWC.WBMTESFL FLG
    WHERE ACC.PROFILE = PRO.PROFILE
      AND PRO.APPNAME = FLG.APPNAME
      AND PRO.ENTITY = FLG.ENTITY
      AND ( FLG.REPORTFLAG = 'N' OR FLG.REPORTFLAG =
        ACC.REPORTFLAG )
      AND ( FLG.HEADFLAG = 'N' OR FLG.HEADFLAG =
        ACC.HEADFLAG )
      AND ( FLG.MGNTFLAG = 'N' OR FLG.MGNTFLAG =
        ACC.MGNTFLAG );
```

End of example.

System 20 can be extended to special application needs. For example, in one embodiment, the security table 505, the OLAP cube description table 510, and the OLAP cube profile description table 515 can be extended to include further additional information that can be exploited for diverse situations implicated by a respective business environment. For example, a user may have rights to access a major part of tables in the ROLAP system 12 but not have rights to access the MOLAP system 14 without further limitations. One or more additional columns in the OLAP cube profile description table 515 can be inserted specifying YES/NO values for a user profile for allowing or rejecting access to the MOLAP system 14.

It is to be understood that the specific embodiments of the invention that have been described are merely illustrative of certain applications of the principle of the present invention. Numerous modifications may be made to the security transfer tool between DB2 and DB2 OLAP described herein without departing from the spirit and scope of the present invention.

The present invention can be realized in hardware, software, or a combination of hardware and software. A security-synchronizing tool according to the present invention can be realized in a centralized fashion in one computer system, for example the access server 11 depicted in FIG. 3, or in a distributed fashion where different elements are spread across several interconnected computer systems. Any computer system or another processor adapted for carrying out the present invention described herein may be used. A typical combination of hardware and software could be a general-purpose computer system with a computer program that, when being loaded and executed, controls the computer system such that it carries out the invention described herein.

The present invention can be embedded in a computer program product that comprises all the features enabling the implementation of the present invention described herein, and which, when loaded in a computer system, is able to carry out the present invention.

What is claimed is:

1. A method for managing access security to a ROLAP system and a MOLAP system that share a subset of common data, the method comprising:
    defining on a computer comprising a processor and memory a security table for a ROLAP system, the security table comprising a userID column, a data group column defining a security profile, and a profile column;
    defining on the computer an OLAP cube description table comprising, for one or more cubes in the MOLAP, a minimum user security definition for user access to the one or more cubes in the MOLAP;
    defining on the computer an OLAP cube profile description table comprising, for the one or more cubes in the MOLAP, one or more access profiles;
    joining the security table, the OLAP cube description table, and the OLAP cube profile description table to autonomously generate a MOLAP security definition consistent with a ROLAP security definition.

2. The method of claim 1, wherein autonomously generating a MOLAP security definition further comprises autonomously executing a user verification sequence, a filter generation sequence, and a user-to-group assignment sequence.

3. The method of claim 2, wherein the user verification sequence further comprises:
    for each cube in the OLAP cube description table, generating a qualified users data set comprising one or more users for whom the security profile defined in the security table meets the minimum user security definition for the cube defined in the OLAP cube description table; and
    for each cube in the OLAP cube description table, dynamically maintaining the qualified users data set.

4. The method of claim 2, wherein the filter generation sequence further comprises:
    generating input for filter creation by joining the security table with the OLAP cube description table and adding the one or more access profiles of the OLAP cube profile description table;
    generate from the input a filter for each unique combination of security setting and access profile; and
    generating for each filter an associated user group.

5. The method of claim 2, wherein the user-to-group assignment sequence further comprises assigning one or more users to a corresponding user group.

6. The method of claim 2, further comprising executing more than one user verification sequences in parallel for more than one cube.

7. The method of claim 2, further comprising executing the user-to-group assignment sequence subsequent to completion of the user verification sequence and the filter generation sequence.

8. A computer program product having a plurality of executable instruction codes for executing on a processor and a memory a method for managing access security to a ROLAP system and a MOLAP system that share a subset of common data, the method comprising:

defining a security table for a ROLAP system, the security table comprising a userID column, a data group column defining a security profile, and a profile column;

defining an OLAP cube description table comprising, for one or more cubes in the MOLAP, a minimum user security definition for user access to the one or more cubes in the MOLAP;

defining an OLAP cube profile description table comprising, for the one or more cubes in the MOLAP, one or more access profiles;

joining the security table, the OLAP cube description table, and the OLAP cube profile description table to autonomously generate a MOLAP security definition consistent with a ROLAP security definition;

wherein the security table, OLAP cube description table, and OLAP cube profile description table are stored in computer readable memory.

9. The computer program product of claim 8, wherein autonomously generating a MOLAP security definition further comprises autonomously executing a user verification sequence, a filter generation sequence, and a user-to-group assignment sequence.

10. The computer program product of claim 9, wherein the user verification sequence further comprises:

for each cube in the OLAP cube description table, generating a qualified users data set comprising one or more users for whom the security profile defined in the security table meets the minimum user security definition for the cube defined in the OLAP cube description table; and for each cube in the OLAP cube description table, dynamically maintaining the qualified users data set.

11. The computer program product of claim 9, wherein the filter generation sequence further comprises:

generating input for filter creation by joining the security table with the OLAP cube description table and adding the one or more access profiles of the OLAP cube profile description table;

generate from the input a filter for each unique combination of security setting and access profile; and generating for each filter an associated user group.

12. The computer program product of claim 9, wherein the user-to-group assignment sequence further comprises assigning one or more users to a corresponding user group.

13. The computer program product of claim 9, further comprising executing more than one user verification sequences in parallel for more than one cube.

14. The computer program product of claim 9, further comprising executing the user-to-group assignment sequence subsequent to completion of the user verification sequence and the filter generation sequence.

15. A system for managing access security to a ROLAP system and a MOLAP system that share a subset of common data, the system comprising:

a ROLAP system that operates on a computer having a processor and memory;

a MOLAP system that operates on a computer having a processor and memory;

a security table for a ROLAP system, the security table comprising a userID column, a data group column defining a security profile, and a profile column;

an OLAP cube description table comprising, for one or more cubes in the MOLAP, a minimum user security definition for user access to the one or more cubes in the MOLAP;

an OLAP cube profile description table comprising, for the one or more cubes in the MOLAP, one or more access profiles;

an application that joins the security table, the OLAP cube description table, and the OLAP cube profile description table to autonomously generate a MOLAP security definition consistent with a ROLAP security definition.

16. The system of claim 15, wherein autonomously generating a MOLAP security definition further comprises autonomously executing a user verification sequence, a filter generation sequence, and a user-to-group assignment sequence.

17. The system of claim 16, wherein the user verification sequence further comprises:

for each cube in the OLAP cube description table, generating a qualified users data set comprising one or more users for whom the security profile defined in the security table meets the minimum user security definition for the cube defined in the OLAP cube description table; and for each cube in the OLAP cube description table, dynamically maintaining the qualified users data set.

18. The system of claim 16, wherein the filter generation sequence further comprises:

generating input for filter creation by joining the security table with the OLAP cube description table and adding the one or more access profiles of the OLAP cube profile description table;

generate from the input a filter for each unique combination of security setting and access profile; and generating for each filter an associated user group.

19. The system of claim 16, wherein the user-to-group assignment sequence further comprises assigning one or more users to a corresponding user group.

20. The system of claim 16, the application executing more than one user verification sequences in parallel for more than one cube.

* * * * *